(12) United States Patent
Okamoto et al.

(10) Patent No.: US 11,188,011 B2
(45) Date of Patent: Nov. 30, 2021

(54) ELECTROPHOTOGRAPHIC BELT AND ELECTROPHOTOGRAPHIC IMAGE FORMING APPARATUS

(71) Applicant: CANON KABUSHIKI KAISHA, Tokyo (JP)

(72) Inventors: Kaoru Okamoto, Chiba (JP); Atsushi Hori, Chiba (JP); Naoto Kameyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/241,786

(22) Filed: Apr. 27, 2021

(65) Prior Publication Data

US 2021/0341858 A1    Nov. 4, 2021

(30) Foreign Application Priority Data

May 1, 2020 (JP) .............................. JP2020-081499
Apr. 6, 2021 (JP) .............................. JP2021-064774

(51) Int. Cl.
| G03G 15/16 | (2006.01) |
| G03G 15/00 | (2006.01) |
| B29C 65/00 | (2006.01) |
| G03G 5/147 | (2006.01) |

(52) U.S. Cl.
CPC ......... *G03G 15/162* (2013.01); *G03G 15/754* (2013.01); *B29C 66/4324* (2013.01); *G03G 5/14708* (2013.01); *G03G 2215/00957* (2013.01); *G03G 2215/1623* (2013.01)

(58) Field of Classification Search
CPC ............... G03G 15/162; G03G 15/754; G03G 2215/1623; G03G 2215/00957; G03G 5/14708
See application file for complete search history.

(56) References Cited

U.S. PATENT DOCUMENTS

2012/0213546 A1\* 8/2012 Kawamata ........... G03G 15/162
399/101

FOREIGN PATENT DOCUMENTS

| JP | H10274887 A | 10/1998 |
| JP | 2001312159 A | 11/2001 |
| JP | 2012078599 A | 4/2012 |
| JP | 2015203854 A | 11/2015 |

\* cited by examiner

*Primary Examiner* — Benjamin R Schmitt
(74) *Attorney, Agent, or Firm* — Canon U.S.A., Inc., IP Division (57) ABSTRACT

An electrophotographic belt including: a base layer, an elastic layer formed on the base layer, and a surface layer formed on the elastic layer. The surface layer contains a binder resin and polytetrafluoroethylene particles. A content of the polytetrafluoroethylene particles is 200 parts by mass or more with respect to 100 parts by mass of the binder resin. The polytetrafluoroethylene particles have a number average particle diameter of 200 nm or less.

10 Claims, 4 Drawing Sheets

ELECTROPHOTOGRAPHIC BELT AND ELECTROPHOTOGRAPHIC IMAGE FORMING APPARATUS

BACKGROUND

Field

The present disclosure relates to an electrophotographic belt to be used, for example, as an intermediate transfer belt in an electrophotographic image forming apparatus, such as a copying machine and a printer, and to an electrophotographic image forming apparatus.

Description of the Related Art

In an electrophotographic image forming apparatus (hereinafter sometimes referred to as "image forming apparatus"), there has been widely adopted a tandem system for obtaining a full-color image by primarily transferring a toner image of each color formed on a photosensitive member for each color of YMCK onto an intermediate transfer belt and then secondarily transferring the toner image onto a transfer material (recording medium), such as paper.

In such image forming apparatus, in order to further improve the image quality of an electrophotographic image, an electrophotographic belt including an elastic layer may be used as an intermediate transfer belt. Such electrophotographic belt can reduce the pressure applied to a toner in a secondary transfer portion, and can suppress occurrence of a harmful effect on an image called a so-called void phenomenon. In addition, the electrophotographic belt is also effective in improving secondary transferability of the toner onto thick paper or paper having irregularities because the adhesiveness between the electrophotographic belt and the paper in the secondary transfer portion is excellent.

In addition, in order to further enhance the transfer efficiency of the toner onto the paper in the secondary transfer section, a toner carrying surface (hereinafter sometimes referred to as "outer surface") of the electrophotographic belt may be formed of a surface layer excellent in toner releasability.

In Japanese Patent Application Laid-Open No. 2015-203854, there is disclosed an intermediate transfer belt in which a base material layer (a) made of a resin, an elastic layer (b) containing a resin having rubber elasticity, and a surface layer (c) containing a urethane rubber and a hydrophobic filler and having a water contact angle of 90° C. or more are laminated in the stated order. Then, polytetrafluoroethylene (PTFE) is given as an example of the hydrophobic filler. Further, there is disclosed that the average particle diameter of the hydrophobic filler is preferably from 0.1 μm to 2.0 μm, and the content of the hydrophobic filler in the surface layer is preferably from 40 parts by weight to 100 parts by weight when the hydrophobic filler is a fluororesin filler.

When the toner carrying surface (hereinafter sometimes referred to as "outer surface") of the intermediate transfer belt is cleaned through use of a cleaning blade, it is effective to sufficiently reduce the friction coefficient between the intermediate transfer belt and the cleaning blade in order to prevent occurrence of turn-up and chattering sound of the cleaning blade.

However, the investigations made by the inventors have found that it is required to incorporate a large amount of PTFE particles in order to sufficiently decrease the friction coefficient of the surface layer containing the PTFE particles, and meanwhile, along with an increase in content of the PTFE particles, the surface layer becomes harder, and the difference in hardness between the elastic layer and the surface layer is increased, with the result that, when the intermediate transfer belt is bent and mounted in an electrophotographic image forming apparatus, cracking of the surface layer and peeling between the elastic layer and the surface layer may occur.

SUMMARY

One embodiment of the present disclosure is directed to providing an electrophotographic belt which is excellent in cleaning property of an outer surface, and in which cracking of a surface layer and peeling of the surface layer from an elastic layer are less liable to occur even when the electrophotographic belt is mounted in an electrophotographic image forming apparatus to be used for forming an electrophotographic image. In addition, another embodiment of the present disclosure is directed to providing an electrophotographic image forming apparatus capable of stably forming a high-quality electrophotographic image.

According to one embodiment of the present disclosure, there is provided an electrophotographic belt including: a base layer; an elastic layer formed on the base layer; and a surface layer formed on the elastic layer, wherein the surface layer contains a binder resin and polytetrafluoroethylene particles, wherein a content of the polytetrafluoroethylene particles is 200 parts by mass or more with respect to 100 parts by mass of the binder resin, and wherein the polytetrafluoroethylene particles have a number average particle diameter of 200 nm or less.

In addition, according to another embodiment of the present disclosure, there is provided an electrophotographic image forming apparatus including the above-mentioned electrophotographic belt as an intermediate transfer belt.

Further features of the present disclosure will become apparent from the following description of exemplary embodiments with reference to the attached drawings.

DESCRIPTION OF THE EMBODIMENTS

Now, an electrophotographic belt having an endless belt shape according to at least one embodiment of the present disclosure is described in detail. The technical scope of the present disclosure is not limited to the following description.

Figure 1:
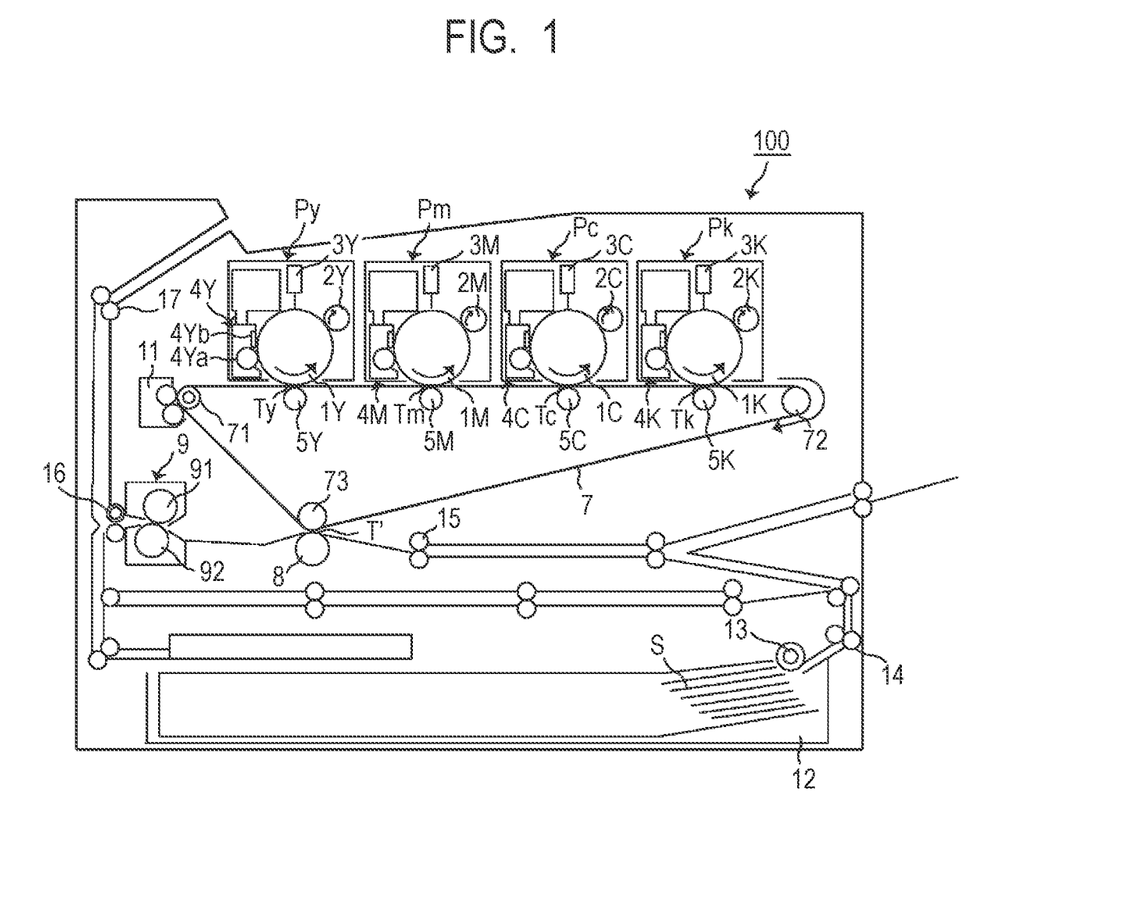
FIG. 1 is a sectional view of an electrophotographic image forming apparatus including, as an intermediate transfer belt, an electrophotographic belt having an endless shape according to one embodiment of the present disclosure.

The electrophotographic belt is used as, for example, an intermediate transfer belt 7 in an electrophotographic image forming apparatus illustrated in FIG. 1.

Figure 2:
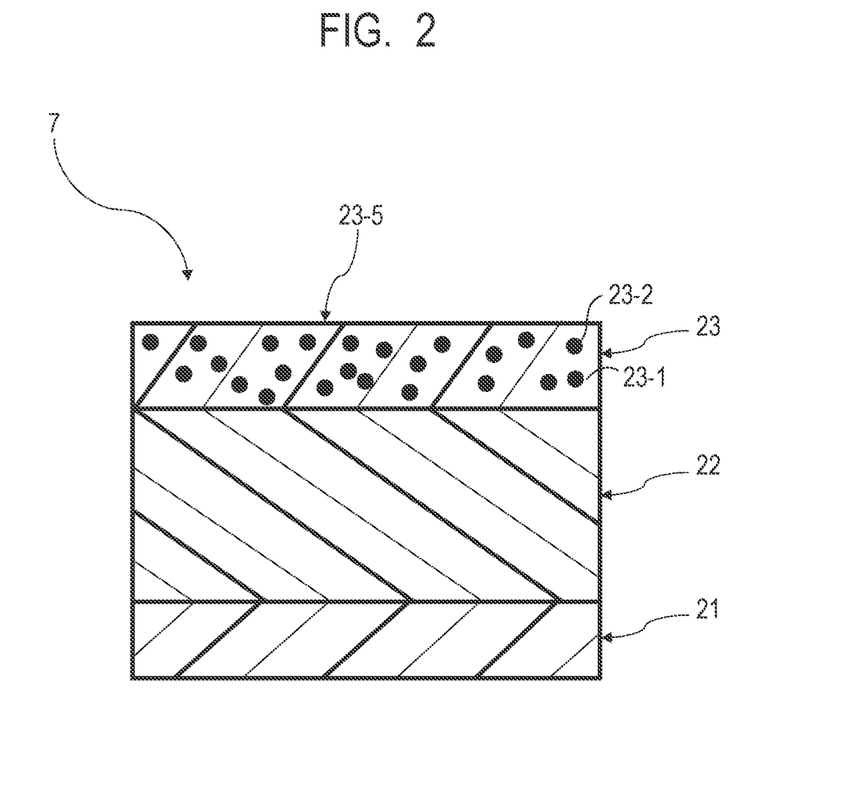
FIG. 2 is a sectional view in a direction orthogonal to a circumferential direction of the electrophotographic belt having an endless shape according to the one embodiment of the present disclosure.

A cross-section in a direction orthogonal to a circumferential direction of the electrophotographic belt is illustrated in FIG. 2.

The electrophotographic belt has a structure in which at least a base layer 21, an elastic layer 22, and a surface layer 23 are laminated. The surface layer 23 forms a toner image carrying surface when the electrophotographic belt is used as the intermediate transfer belt. The electrophotographic belt according to the present disclosure is not limited to the laminate structure of those three layers, and a primer layer configured to improve adhesiveness, a stress relaxation layer configured to suppress cracking of the surface layer 23, or an intermediate layer configured to suppress a bled substance may be formed between the respective layers.

(Base Layer)

The base layer 21 has an endless shape.

Examples of a material suitable for the base layer 21 include polyether ether ketone, polyethylene terephthalate, polybutylene naphthalate, polyester, polyimide, polyamide, polyamide imide, polyacetal, polyphenylene sulfide, and polyvinylidene fluoride.

A conductive compound such as metal powder, conductive oxide powder, conductive carbon, a lithium salt, or an ionic liquid may be added to the resin for the base layer 21 to impart conductivity to the resin. In the following Examples, polyvinylidene fluoride having a polyalkylene glycol and a lithium salt added thereto was used from the viewpoint of being able to obtain excellent productivity and conductivity, but a combination of the other resins and conductive agents given as examples may also be used.

The film thickness of the base layer 21 is preferably 10 μm or more and 500 μm or less. When the film thickness is less than 10 μm, the mechanical strength is remarkably decreased. When the film thickness is more than 500 μm, the rigidity becomes too strong, and it becomes difficult to use the electrophotographic belt including such base layer 21 as an intermediate transfer member.

(Elastic Layer)

The elastic layer 22 formed on an outer peripheral surface of the base layer 21 is required to have appropriate flexibility in order to follow the surface shape of a recording medium. Examples of a material suitable for such elastic layer include: rubber materials, such as a silicone rubber, a urethane rubber, a chloroprene rubber, and an acrylic rubber; and elastomer materials, such as a olefin elastomer, a styrene elastomer, a polyamide elastomer, a polyester elastomer, and a polyurethane elastomer.

A conductive compound such as metal powder, conductive oxide powder, conductive carbon, a lithium salt, or an ionic liquid may be added to the elastic layer 22 to impart conductivity to the layer. In the following Examples, a polyurethane elastomer having a polyalkylene glycol and a lithium salt added thereto, which served as a thermoplastic elastomer, was used from the viewpoint of being able to obtain excellent productivity, but a combination of the other resins and conductive agents given as examples may also be used.

The film thickness of the elastic layer 22 is preferably from 100 μm to 1,000 μm, more preferably from 200 μm to 500 μm. In addition, the JIS-A hardness of the elastic layer 22 is preferably 80 degrees or less.

The blending amount of the conductive agent with respect to the elastic layer 22 is preferably 10 parts by mass or less, more preferably 5 parts by mass or less with respect to 100 parts by mass of the urethane rubber. Thus, stable conductivity suitable for the intermediate transfer belt is imparted to the elastic layer 22.

In addition, the elastic layer 22 may also contain additives, such as a filler, a cross-linking accelerator, a cross-linking retarder, a cross-linking aid, a scorch inhibitor, an antioxidant, a softening agent, a heat stabilizer, a flame retardant, a flame retardant aid, a UV absorber, and a rust preventive.

The intermediate transfer belt is energized in a transfer portion, and hence is required to have flame retardancy. It is difficult to secure required flame retardancy in various elastomers and rubbers when a flame retardant is not added thereto. Examples of the flame retardant include metal hydroxides, such as magnesium hydroxide and aluminum hydroxide, which utilize endothermic action, platinum compounds and phenolic compounds that suppress thermal decomposition, and intumescent-based compounds and phosphate ester condensation-based compounds that have an oxygen blocking effect.

In addition, examples of the filler include reinforcing fillers, such as fumed silica, crystalline silica, wet silica, fumed titanium oxide, and cellulose nanofibers.

Further, a primer layer (not shown) may be formed between the base layer 21 and the elastic layer 22 as required in order to improve adhesiveness. The thickness of the primer layer is preferably 0.1 μm or more and 2 μm or less from the viewpoint of reducing cohesive failure in the primer layer.

(Surface Layer)

The surface layer 23 formed on an outer peripheral surface of the elastic layer 22 contains a binder resin 23-1 and polytetrafluoroethylene (PTFE) particles 23-2. The film thickness of the surface layer 23 is preferably from 0.5 μm to 20 μm. The PTFE particles 23-2 are configured to impart excellent toner releasability and an excellent cleaning property to a surface (hereinafter sometimes referred to as "outer surface") 23-5 of the surface layer 23 on an opposite side to a side facing the elastic layer 22. The outer surface 23-5 of the surface layer forms a toner carrying surface of the electrophotographic belt 7.

As the binder resin, a urethane resin and a urethane acrylate resin are preferred because those resins have satisfactory abrasion resistance and bending resistance.

As a method of forming the surface layer containing a urethane resin, there are given a method involving applying a paint for forming a surface layer by spray coating or dip coating and curing the paint for forming a surface layer by heating, and a method involving applying a paint for forming a surface layer by spray coating or dip coating and curing the paint for forming a surface layer by irradiation with light, such as an electron beam or an ultraviolet ray.

The content of the PTFE particles in the surface layer is 200 parts by mass or more with respect to 100 parts by mass of the binder resin. The content is more preferably 250 parts by mass or more and 300 parts by mass or less with respect to 100 parts by mass of the binder resin. When the content of the PTFE particles in the surface layer is adjusted to within such ranges, the friction between the outer surface of the electrophotographic belt and the cleaning blade can be reduced, and the turn-up of the cleaning blade can be prevented. As a result, the outer surface of the electrophotographic belt can be stably cleaned.

The number average particle diameter of the PTFE particles in the surface layer is 200 nm or less.

Figure 4:
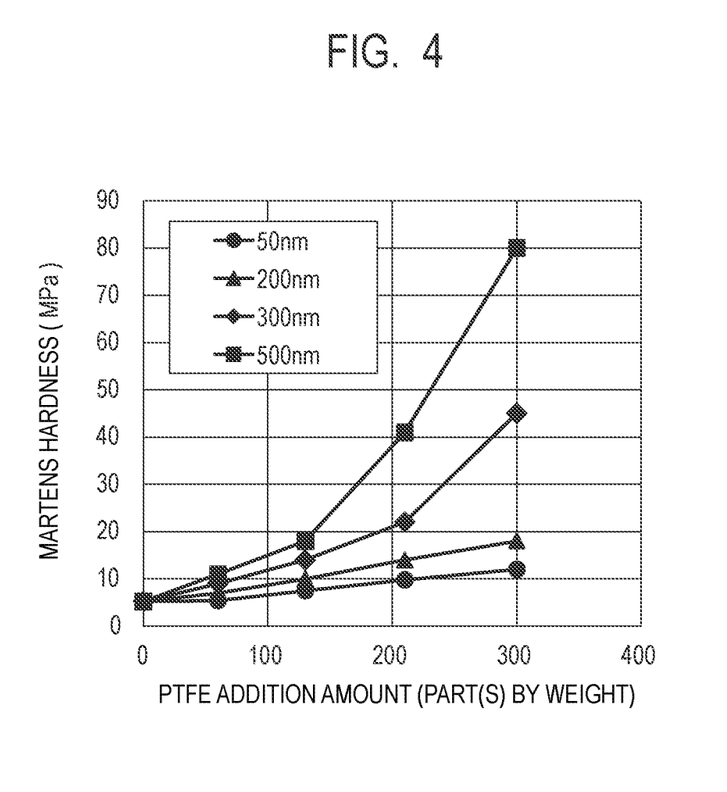
FIG. 4 is a graph for showing a relationship between the number average particle diameter of PTFE particles in a surface layer containing a predetermined amount of the PTFE particles and the Martens hardness of the surface layer.

Specifically, in the case where the content of the PTFE particles with respect to 100 parts by mass of the binder resin in the surface layer was increased from 200 parts by mass as described above, when the number average particle diameter of the PTFE particles was more than 200 nm, the Martens hardness of the surface layer was abruptly increased as shown in FIG. 4. An excessive increase in Martens hardness causes cracks in the surface layer when the electrophotographic belt is bent, and also causes peeling of the surface layer from the elastic layer.

Meanwhile, in the case where the number average particle diameter of the PTFE particles was 200 nm or less, even when the content of the PTFE particles in the surface layer was increased from 200 parts by mass, an excessive increase in Martens hardness of the surface layer was not observed.

As described above, in order to obtain an electrophotographic belt that is excellent in bending resistance as well as in cleaning property of the outer surface, it is effective to set the content of the PTFE particles in the surface layer to 200 parts by mass or more with respect to 100 parts by mass of the binder resin and set the number average particle diameter of the PTFE particles to 200 nm or less.

As the PTFE particles having a number average particle diameter of 200 nm or less, for example, a commercially available product may be used. As the commercially available product, there are given "Argoflon L100" (product name, manufactured by Nippon Solvay K.K., number average particle diameter of primary particles: 50 nm) and "Lubron L-5" (product name, manufactured by Daikin Industries, Ltd., number average particle diameter of primary particles: 200 nm).

(Image Forming Apparatus)

An example of an image forming apparatus using an electrophotographic belt according to this embodiment is described with reference to FIG. 1. An electrophotographic image forming apparatus 100 illustrated in FIG. 1 is a color electrophotographic image forming apparatus (color laser printer).

In the electrophotographic image forming apparatus, image forming units Py, Pm, Pc, and Pk of respective colors of yellow (Y), magenta (M), cyan (C), and black (K) are arranged in the stated order along a flat portion of the intermediate transfer belt 7 that is the electrophotographic belt according to this embodiment in a movement direction thereof. Herein, there are illustrated electrophotographic photosensitive members 1Y, 1M, 1C, and 1K, charging rollers 2Y, 2M, 2C, and 2K, laser exposure devices 3Y, 3M, 3C, and 3K, developing devices 4Y, 4M, 4C, and 4K, and primary transfer rollers 5Y, 5M, 5C, and 5K. The basic configurations of the respective image forming units are the same, and hence the details thereof are described only with respect to the yellow image forming unit Py.

The yellow image forming unit Py includes, as an image bearing member, the drum-type electrophotographic photosensitive member (hereinafter sometimes referred to as "photosensitive drum" or "first image bearing member") 1Y. The photosensitive drum 1Y is formed by laminating a charge generating layer, a charge transporting layer, and a surface protective layer in the stated order on a cylinder made of aluminum serving as a substrate.

In addition, the yellow image forming unit Py includes the charging roller 2Y serving as a charging unit. The surface of the photosensitive drum 1Y is uniformly charged by applying a charging bias to the charging roller 2Y.

The laser exposure device 3Y serving as an image exposure unit is arranged above the photosensitive drum 1Y. The laser exposure device 3Y is configured to scan and expose the surface of the uniformly charged photosensitive drum 1Y in accordance with image information, to thereby form an electrostatic latent image of a yellow color component on the surface of the photosensitive drum 1Y. The electrostatic latent image formed on the photosensitive drum 1Y is developed with a toner serving as a developer by the developing device 4Y serving as a developing unit. The developing device 4Y includes a developing roller 4Ya serving as a developer carrier and a regulating blade 4Yb serving as a developer amount regulating member, and is also configured to accommodate a yellow toner serving as a developer. The developing roller 4Ya having the yellow toner supplied thereto is brought into light pressure contact with the photosensitive drum 1Y in a developing portion, and is rotated in a forward direction with a speed difference from the photosensitive drum 1Y. The yellow toner conveyed to the developing portion by the developing roller 4Ya adheres to the electrostatic latent image formed on the photosensitive drum 1Y when a developing bias is applied to the developing roller 4Ya. As a result, a visible image (yellow toner image) is formed on the photosensitive drum 1Y.

The intermediate transfer belt 7 is tensioned on a drive roller 71, a tension roller 72, and as driven roller 73, and is brought into contact with the photosensitive drum 1Y to be moved (driven to rotate) in a direction of the arrow in the figure.

The yellow toner image formed on the photosensitive drum (first image bearing member) 1Y having reached a primary transfer portion Ty is primarily transferred onto the intermediate transfer belt 7 by a primary transfer member (primary transfer roller 5Y) arranged so as to be opposed to the photosensitive drum 1Y through intermediation of the intermediate transfer belt 7.

Similarly, the above-mentioned image forming operation is performed in the image forming units Pm, Pc, and Pk of respective colors of magenta (M), cyan (C), and black (K) along with the movement of the intermediate transfer belt 7, and toner images of four colors of yellow, magenta, cyan, and black are laminated on the intermediate transfer belt 7. The four-color toner layers are conveyed along with the movement of the intermediate transfer belt 7, and are collectively transferred onto a transfer material S (hereinafter sometimes referred to as "second image bearing member") conveyed at a predetermined timing by a secondary transfer roller 8 serving as a secondary transfer unit in a secondary transfer portion T'. In such secondary transfer, a transfer voltage of several kV is generally applied in order to secure a sufficient transfer rate.

The transfer material S is supplied to a conveyance path by a pickup roller 13 from a cassette 12 in which the transfer material S is stored. The transfer material S supplied to the conveyance path is conveyed to the secondary transfer portion T' by a conveyance roller pair 14 and a registration roller pair 15 in synchronization with the four-color toner images transferred onto the intermediate transfer belt 7.

The toner images transferred onto the transfer material S are fixed by a fixing device 9 to form, for example, a full-color image. The fixing device 9 includes a fixing roller 91 including a heating unit and a pressure roller 92, and is configured to fix the unfixed toner images on the transfer material S by heating and pressurization. After that, the transfer material S is delivered to the outside of the apparatus by a conveyance roller pair 16, a delivery roller pair 17, and the like.

A cleaning unit 11 of the intermediate transfer belt 7 is arranged on a downstream side of the secondary transfer portion T' in a drive direction of the intermediate transfer belt 7, and is configured to remove a transfer residual toner remaining on the intermediate transfer belt 7 without being transferred onto the transfer material S in the secondary transfer portion T'.

As described above, the electrical transfer process of the toner images from the photosensitive member to the intermediate transfer belt and from the intermediate transfer belt to the transfer material is repeated. In addition, when recording on a large number of transfer materials is repeated, the electrical transfer process is further repeated.

According to one embodiment of the present disclosure, the electrophotographic belt, which is excellent in cleaning property of an outer surface, and in which cracking of a surface layer and peeling of the surface layer from an elastic layer are less liable to occur, can be provided. In addition, according to another embodiment of the present disclosure, the electrophotographic image forming apparatus capable of stably forming a high-quality electrophotographic image can be provided.

EXAMPLES

Example 1

(Production of Base Layer Pellet)

The following materials were kneaded through use of a twin-screw kneader (product name: PCM30, manufactured by Ikegai Corp.) to obtain a pellet body thereof.

Polyvinylidene fluoride (product name: Solef 9007, manufactured by Solvay Specialty Polymers Japan K.K.) 95 parts by mass Lithium perchlorate (anhydrous 98%, manufactured by Kanto Chemical Co., Inc.) 0.7 part by mass Ethylene oxide-propylene oxide copolymer (Pluronic F-127, manufactured by BASF) 4.3 parts by mass "Pluronic F-127" is a nonionic surfactant represented by the following structural formula. In addition, in the following structural formula, "a" and "c" each independently represent an integer within a range of from 60 to 70, and "b" represents an integer within a range of from 90 to 100.

$HO-(CH_2CH_2O)a\text{-}(CH_2(CH(CH_3)O)b\text{-}(CH_2CH_2O)c\text{-}H^2$ (Production of Elastic Layer Pellet)

The following materials were kneaded through use of a twin-screw kneader (product name: PCM30, manufactured by Ikegai Corp.) to obtain a pellet body thereof.

Thermoplastic polyurethane (product name: Elastollan 1175A10W, manufactured by BASF Japan) 98 parts by mass Lithium perchlorate (anhydrous 98%, manufactured by Kanto Chemical Co., Inc.) 0.2 part by mass Ethylene oxide-propylene oxide copolymer (Pluronic F-127, manufactured by BASF) 1.8 parts by mass (Production of Two-layer Belt Formed of Base Layer and Elastic Layer)

A belt having a two-layer configuration was produced by coextrusion through use of the base layer pellet and elastic layer pellet produced in the foregoing.

Specifically, a single-screw extruder (product name: GT40, manufactured by Research Laboratory of Plastics Technology Co., Ltd.) was prepared for each of the base layer pellet and the elastic layer pellet. Subsequently, the two single-screw extruders were connected to a cylindrical die for coextrusion, and cylindrical extrusion molding was performed to produce a two-layer belt having an endless belt shape.

Specifically, respective molten resins discharged from the single-screw extruders were formed into an inner layer of polyvinylidene fluoride and an outer layer of thermoplastic polyurethane by the cylindrical die for coextrusion. In addition, the thicknesses of the respective layers were set to 115 µm and 250 µm through use of a take-up speed of a cylindrical take-up machine and a relative ratio between feeder speeds of the base layer pellet and the elastic layer pellet. In a pick-up process, the resin was brought into contact with a cooling mandrel provided between the cylindrical die and the cylindrical take-up machine to be cooled and solidified, and the solidified resin was cut to a width of 460 mm with a cylindrical cutting machine installed in a lower portion of the cylindrical pick-up machine, to thereby obtain a two-layer belt.

The hardness of the elastic layer was measured with a JIS A rubber hardness meter to be 75 degrees.

(Surface Modification of Elastic Layer)

In order to improve the adhesiveness between the elastic layer and a surface layer, the surface of the elastic layer on which the surface layer was to be formed was irradiated with UV light through use of an excimer lamp (manufactured by M.D.COM inc) emitting light having a single wavelength of 172 nm as an excimer UV irradiation unit. Specifically, the two-layer belt formed of the base layer and the elastic layer was fitted to a columnar core, and the core that was present at a distance of 1 mm from the surface of the excimer lamp was irradiated with UV light for 30 minutes in a space having a nitrogen gas flowed thereto while the core was rotated at a rotation speed of 5 rpm.

(Preparation of Surface Layer)

The following materials were mixed to prepare a paint for forming a surface layer. The amount of PTFE particles in the paint for forming a surface layer prepared herein is adjusted so that the content of the PTFE particles was 300 parts by mass with respect to 100 parts by mass of polyurethane in a dry film of a coating film of the paint for forming a surface layer.

Polyurethane resin aqueous solution (product name: Hydran WLS-201, manufactured by DIC Corporation, solid content ratio: 35%) 100 parts by mass PTFE particles (product name: Algoflon L100; manufactured by Solvay, number average particle diameter of primary particles: 50 nm) 105 parts by mass The two-layer belt produced in the foregoing was fitted to the core, and the paint for forming a surface layer was applied to an outer surface of the elastic layer through use of a spray gun (product name: W-101, manufactured by ANEST IWATA Corporation) while the core was rotated at 90 rpm. The discharge amount of the paint for forming a surface layer was set so that a dry film thickness of a coating film of the paint for forming a surface layer was 1 µm. The two-layer belt having the coating film of the paint for forming a surface layer formed thereon was heated in a heating furnace at a temperature of 130° C. for 30 minutes, and then taken out from the heating furnace to obtain an electrophotographic belt B1.

Example 2

An electrophotographic belt B2 was obtained in the same manner as in Example 1 except that the materials for the paint for forming a surface layer were changed as follows. The amount of PTFE particles in the paint for forming a surface layer prepared herein is adjusted so that the content of the PTFE particles was 300 parts by mass with respect to 100 parts by mass of polyurethane in a dry film of a coating film of the paint for forming a surface layer.

(Preparation of Surface Layer)
Polyurethane resin aqueous solution
(product name: Hydran 201, manufactured by DIC Corporation, solid content ratio: 35%)
  100 parts by mass
  PTFE particles
(product name: Lubron L-5; manufactured by Daikin Industries, Ltd., number average particle diameter of primary particles: 200 nm) 105 parts by mass Example 3

An electrophotographic belt B3 was obtained in the same manner as in Example 1 except that the materials for the paint for forming a surface layer were changed as follows. The amount of PTFE particles in the paint for forming a surface layer prepared herein is adjusted so that the content of the PTFE particles was 200 parts by mass with respect to 100 parts by mass of polyurethane in a dry film of a coating film of the paint for forming a surface layer.
(Preparation of Surface Layer)
Polyurethane resin aqueous solution
(product name: Hydran 201, manufactured by DIC Corporation, solid content ratio: 35%)
  100 parts by mass
  PTFE particles
(product name: Algoflon L100; manufactured by Solvay, number average particle diameter of primary particles: 50 nm) 70 parts by mass Example 4

An electrophotographic belt B4 was obtained in the same manner as in Example 1 except that the materials for the paint for forming a surface layer were changed as follows. The amount of PTFE particles in the paint for forming a surface layer prepared herein is adjusted so that the content of the PTFE particles was 200 parts by mass with respect to 100 parts by mass of polyurethane in a dry film of a coating film of the paint for forming a surface layer.
(Preparation of Surface Layer)
Polyurethane resin aqueous solution
(product name: Hydran 201, manufactured by DIC Corporation, solid content ratio: 35%)
  100 parts by mass
  PTFE particles
(product name: Lubron L-5; manufactured by Daikin Industries, Ltd., number average particle diameter of primary particles: 200 nm) 70 parts by mass Comparative Example 1

An electrophotographic belt B11 was obtained in the same manner as in Example 1 except that the materials for the paint for forming a surface layer were changed as follows. The amount of PTFE particles in the paint for forming a surface layer prepared herein is adjusted so that the content of the PTFE particles was 200 parts by mass with respect to 100 parts by mass of polyurethane in a dry film of a coating film of the paint for forming a surface layer.
(Preparation of Surface Layer)
Polyurethane resin aqueous solution
(product name: Hydran 201, manufactured by DIC Corporation, solid content ratio: 35%)
  100 parts by mass
  PTFE particles
(product name: Lubron L-2; manufactured by Daikin Industries, Ltd., number average particle diameter of primary particles: 250 nm) 70 parts by mass Comparative Example 2

An electrophotographic belt B12 was obtained in the same manner as in Example 1 except that the materials for the paint for forming a surface layer were changed as follows. The amount of PTFE particles in the paint for forming a surface layer prepared herein is adjusted so that the content of the PTFE particles was 150 parts by mass with respect to 100 parts by mass of polyurethane in a dry film of a coating film of the paint for forming a surface layer.
(Preparation of Surface Layer)
Polyurethane resin aqueous solution
(product name: Hydran 201, manufactured by DIC Corporation, solid content ratio: 35%)
  100 parts by mass
  PTFE particles
(product name: Lubron L-5; manufactured by Daikin Industries, Ltd., number average particle diameter of primary particles: 200 nm) 52.5 parts by mass

[Evaluation Method]

The electrophotographic belt of each of Examples and Comparative Examples described above was mounted in the electrophotographic image forming apparatus (product name: imageRUNNER ADVANCE C7580, manufactured by Canon Inc.) illustrated in FIG. 1, and was left to stand still in a high temperature and high humidity environment (temperature of 30° C./Relative humidity of 80%) for 100 hours.

Then, in the high temperature and high humidity environment, an electrophotographic image was continuously printed on 300,000 sheets under the following conditions:

Paper used: Japanese Industrial Standards (JIS) A3 size plain paper (product name: CS068, manufactured by Canon Inc.); and Printed image: Test chart with an image duty of 5%.

[<Evaluation 1> Evaluation of Presence or Absence of Occurrence of Abnormal Noise from Cleaning Unit Portion and Occurrence of Turn-Up of Cleaning Blade]

The presence or absence of occurrence of abnormal noise from a cleaning unit portion (hereinafter referred to as "chattering sound") and occurrence of turn-up of the cleaning blade (hereinafter referred to as "turn-up") in the printing on the 300,000 sheets was observed and evaluated based on the following criteria.

Rank A: "Turn-up" or "chattering sound" did not occur.
Rank B: "Chattering sound" occurred, but "turn-up" did not occur.
Rank C: "Chattering sound" and "turn-up" occurred.

Figure 3:
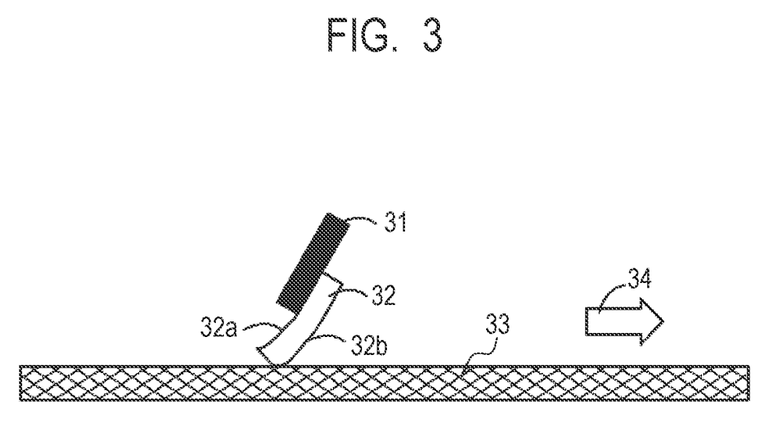
FIG. 3 is a view for illustrating turn-up of a cleaning blade.

Regarding the "turn-up", as illustrated in FIG. 3, a blade holding member 31 is configured to hold an upper side surface 32a of a cleaning blade 32. In general, the surface of an electrophotographic belt 33 is being cleaned while the vicinity of a distal end of a lower side surface 32b of the cleaning blade 32 on an opposite side to the upper side surface 32a is brought into contact with the outer surface of the electrophotographic belt 33, and the electrophotographic belt 33 is traveling in a direction of an arrow 34. It was determined that the "turn-up" occurred when the vicinity of the distal end of the upper side surface 32a of the cleaning blade 32 was brought into contact with the electrophotographic belt 33.

[<Evaluation 2> Cracking and Peeling of Surface Layer, and Image Defect]

After the printing on the 300,000 sheets, the electrophotographic belt 33 was taken out from the electrophotographic image forming apparatus, and the outer surface of the electrophotographic belt was observed with an optical microscope having an objective lens with a magnification of 20 times, to thereby evaluate the presence or absence of cracking of the surface layer and peeling of the surface layer from the elastic layer.

After the observation, the electrophotographic belt was mounted in the electrophotographic image forming apparatus again, and an intermediate tone of Bk (black) (16 gradations on a light density side in 256 gradations) was continuously printed on three sheets of A3 size plain paper, corresponding to one round of the electrophotographic belt, with an image duty of 100%, that is, in an entire printing area. Then, the three obtained images were visually observed, and the presence or absence of chipping or unevenness of the images caused by cracking of the surface layer or peeling of the surface layer from the elastic layer was evaluated. The evaluation results were ranked based on the following criteria.

Rank A: Cracking or peeling of the surface layer is not recognized. In addition, occurrence of an image defect caused by transfer unevenness is not observed, either.

Rank B: Cracking of the surface layer can be slightly observed visually. However, occurrence of an image defect caused by transfer unevenness is not recognized.

Rank C: Cracking and peeling of the surface layer occurred. In addition, an image defect caused by transfer unevenness also occurred.

TABLE 1

|  | Intermediate transfer belt | Addition amount (parts by mass) of PTFE particles with respect to 100 parts by mass of polyurethane | PTFE average particle diameter (nm) | Evaluation 1 | Evaluation 2 |
| --- | --- | --- | --- | --- | --- |
| Example 1 | B1 | 300 | 50 | A | A |
| Example 2 | B2 | 300 | 200 | A | B |
| Example 3 | B3 | 200 | 50 | B | A |
| Example 4 | B4 | 200 | 200 | B | B |
| Comparative Example 1 | B11 | 200 | 250 | B | C |
| Comparative Example 2 | B12 | 150 | 150 | C | B |

In Table 1, there are shown the evaluation results of the elastic intermediate transfer belts produced in each of Examples and each of Comparative Examples. The elastic intermediate transfer belts of Examples 1 to 4 each have an average particle diameter of polytetrafluoroethylene of from 50 nm to 200 nm, which is smaller than the average particle diameter of polytetrafluoroethylene used in Comparative Example 1. For this reason, the mechanical strength of the surface layer was high, and an image defect caused by transfer unevenness ascribed to peeling of the surface layer and cracking of the surface layer did not occur throughout the durability test.

In addition, the elastic intermediate transfer belts of Examples 1 to 4 each have a content of polytetrafluoroethylene higher than that of Comparative Example 2, and hence the elastic intermediate transfer belts of Examples 1 to 4 each have an effect of further reducing the frictional force with the cleaning blade. Accordingly, blade turn-up or chattering did not occur throughout the durability test.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-081499, filed May 1, 2020, and Japanese Patent Application No. 2021-064774, filed Apr. 6, 2021, which are hereby incorporated by reference herein in their entirety.

What is claimed is:

1. An electrophotographic belt comprising:
a base layer;
an elastic layer on the base layer; and
a surface layer on the elastic layer,
wherein the surface layer contains a binder resin and polytetrafluoroethylene particles,
wherein a content of the polytetrafluoroethylene particles is 200 parts by mass or more with respect to 100 parts by mass of the binder resin, and
wherein the polytetrafluoroethylene particles have a number average particle diameter of 200 nm or less.

2. The electrophotographic belt according to claim 1, wherein the polytetrafluoroethylene particles have a number average particle diameter of 50 nm or more.

3. The electrophotographic belt according to claim 1, wherein the content of the polytetrafluoroethylene particles is 250 parts by mass or more with respect to 100 parts by mass of the binder resin.

4. The electrophotographic belt according to claim 1, wherein the content of the polytetrafluoroethylene particles is 300 parts by mass or less with respect to 100 parts by mass of the binder resin.

5. The electrophotographic belt according to claim 1, wherein the electrophotographic belt has an endless belt shape.

6. The electrophotographic belt according to claim 5,
wherein the base layer has an endless belt shape,
the elastic layer is on an outer peripheral surface of the base layer, and
the surface layer is on an outer peripheral surface of the elastic layer.

7. The electrophotographic belt according to claim 1, wherein the binder resin is one of a urethane resin and a urethane acrylate resin.

8. An electrophotographic image forming apparatus comprising:
an image bearing member configured to bear a toner image; and
an intermediate transfer belt configured to carry and convey the toner image that is primarily transferred from the image bearing member in order to secondarily transfer the toner image onto a transfer material,
wherein the intermediate transfer belt includes an electrophotographic belt including a base layer, an elastic layer on the base layer, and a surface layer on the elastic layer,
wherein the surface layer contains a binder resin and polytetrafluoroethylene particles,
wherein a content of the polytetrafluoroethylene particles is 200 parts by mass or more with respect to 100 parts by mass of the binder resin, and
wherein the polytetrafluoroethylene particles have a number average particle diameter of 200 nm or less.

9. The electrophotographic image forming apparatus according to claim 8,
wherein the base layer has an endless belt shape,
wherein the elastic layer is on an outer peripheral surface of the base layer, and
wherein the surface layer is on an outer peripheral surface of the elastic layer.

10. The electrophotographic image forming apparatus according to claim 8, further comprising a cleaning blade that is arranged so that at least a part of the cleaning blade is brought into contact with an outer peripheral surface of the surface layer of the electrophotographic belt.

\* \* \* \* \*